Sept. 29, 1936.  C. B. TERRY  2,055,883
AIRCRAFT ALTIMETER
Filed Jan. 18, 1932  5 Sheets-Sheet 1

INVENTOR
CLIFFORD B. TERRY
BY H. S. Grover
ATTORNEY

Sept. 29, 1936.  C. B. TERRY  2,055,883
AIRCRAFT ALTIMETER
Filed Jan. 18, 1932  5 Sheets-Sheet 2
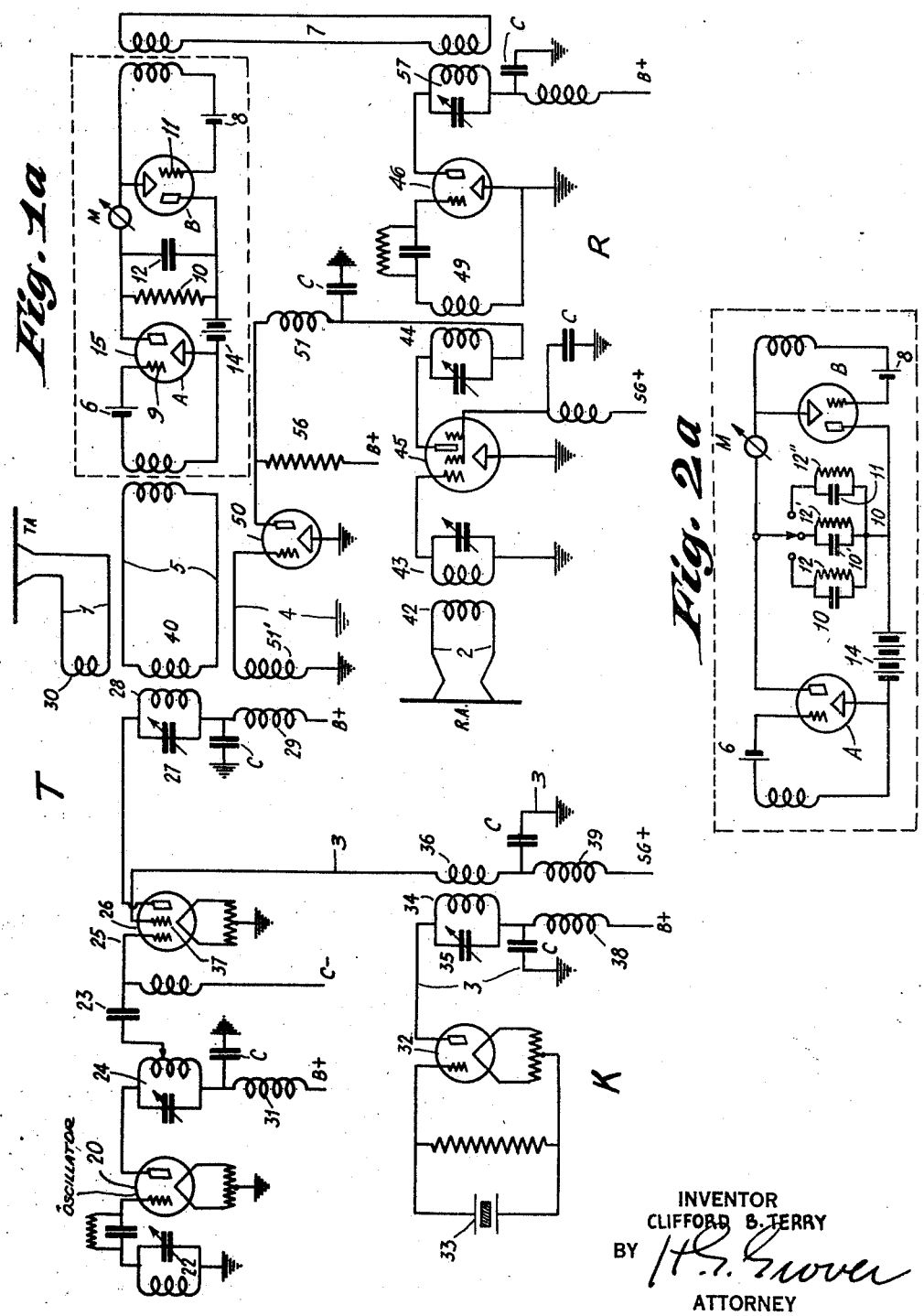
INVENTOR
CLIFFORD B. TERRY
BY H. S. Grover
ATTORNEY Sept. 29, 1936.  C. B. TERRY  2,055,883

AIRCRAFT ALTIMETER

Filed Jan. 18, 1932  5 Sheets-Sheet 3

INVENTOR
CLIFFORD B. TERRY
BY
ATTORNEY

Sept. 29, 1936.     C. B. TERRY     2,055,883
AIRCRAFT ALTIMETER
Filed Jan. 18, 1932     5 Sheets-Sheet 4
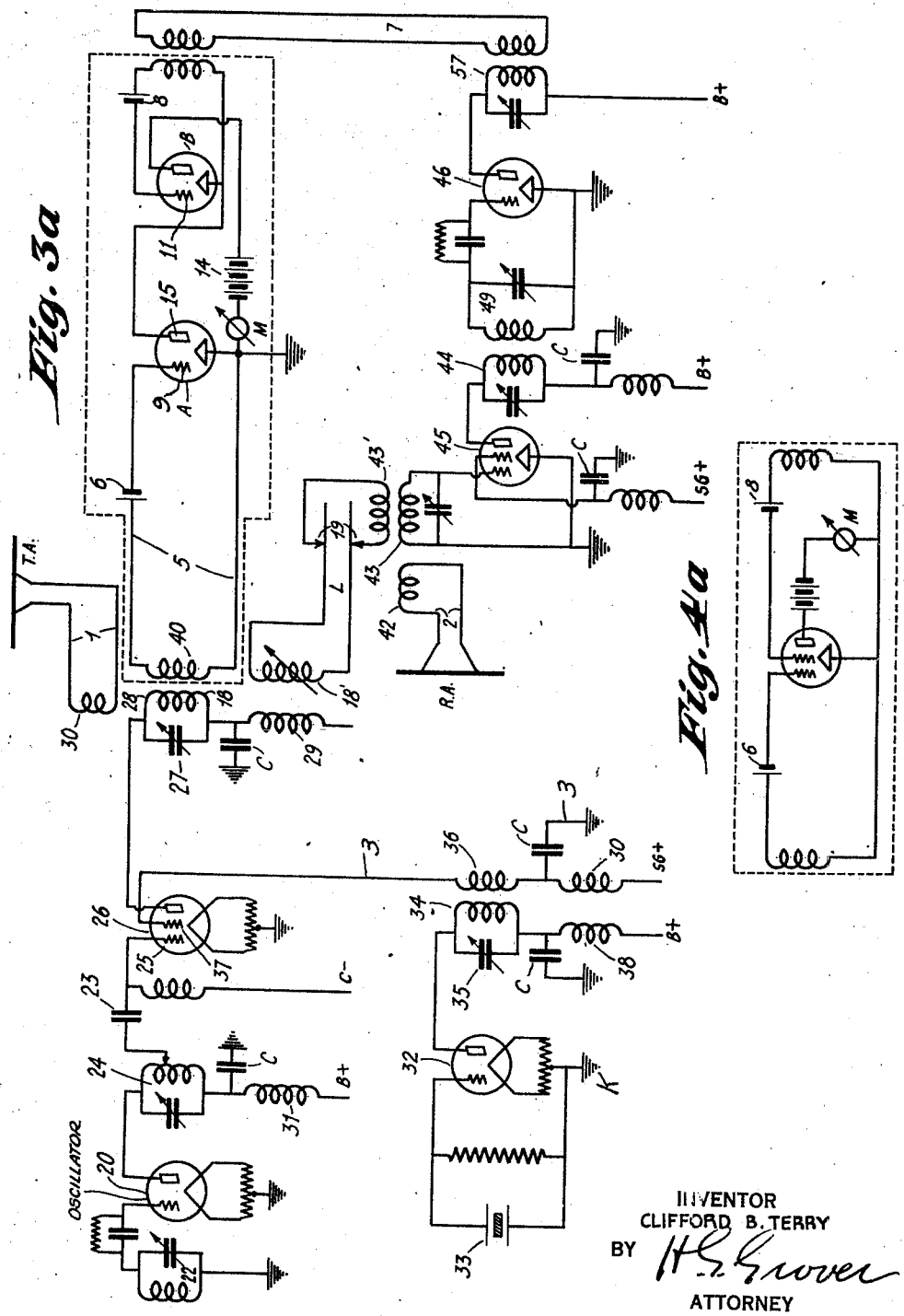
INVENTOR
CLIFFORD B. TERRY
BY
ATTORNEY Sept. 29, 1936.   C. B. TERRY   2,055,883
AIRCRAFT ALTIMETER
Filed Jan. 18, 1932   5 Sheets-Sheet 5
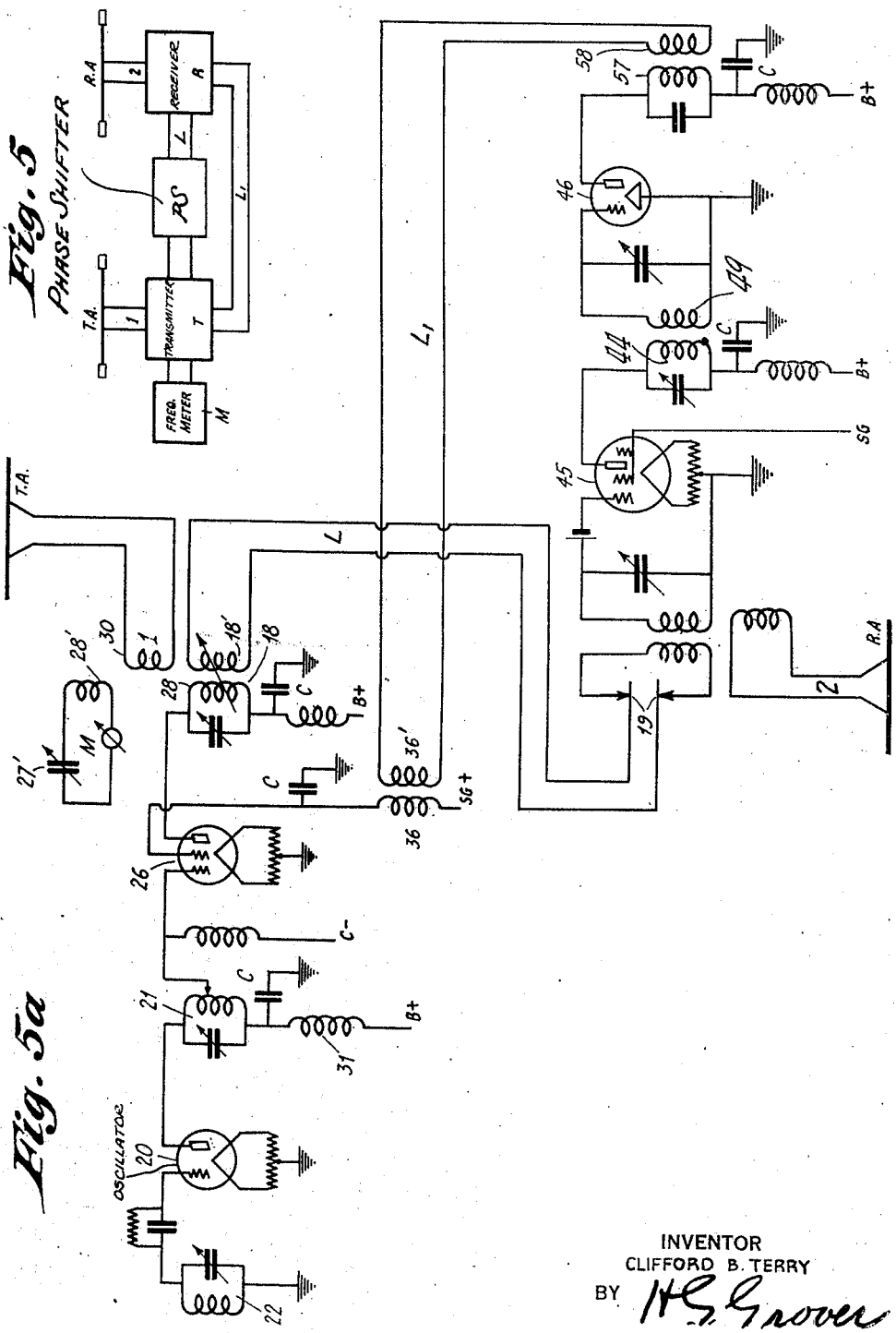
INVENTOR
CLIFFORD B. TERRY
BY H. S. Grover
ATTORNEY Patented Sept. 29, 1936

2,055,883

UNITED STATES PATENT OFFICE 2,055,883

AIRCRAFT ALTIMETER

Clifford B. Terry, East Orange, N. J., assignor to Radio Corporation of America, a corporation of Delaware Application January 18, 1932, Serial No. 587,264

20 Claims. (Cl. 250—1)

This invention relates to means for measuring distance and more in particular to means to be used on a plane for measuring the distance between the plane and ground, or between the plane and a mountain or other obstruction in the path thereof. For purposes of description, applicant has indicated that the measuring means is to be used on a plane. Applicant does not intend to be limited by such description since, obviously, the measuring means may be used on any mobile craft, vessel or vehicle. For purposes of illustration it will be assumed that the means of the present invention is located on a plane.

It has heretofore been the practice when measuring the altitude of a plane from the ground to utilize an aneroid barometer calibrated in terms of height of the plane above ground.

This barometer is installed on the plane and as the plane ascends the air pressure on the barometer decreases. This gives a fairly good indication of height to within a hundred feet or so when the plane carrying the barometer starts from the same height above sea level each time. However, when ascending or descending at the ordinary rate there is found to be a lag in the barometer reading of about 200 feet or more. This renders the barometer practically useless for altitude measuring work close to the ground. In the devices used heretofore the scale of the altimeter must be set before the plane leaves the ground to a point corresponding with the air pressure at the point and time of departure. The air pressure varies with time and locality so that, assuming a pilot to have flown from one field and set his altimeter there, it is not likely that the altimeter will be correct when he lands at a different field at a different altitude some distance away some time later. Furthermore, the altimeter will need resetting before the plane ascends again or subsequent readings will be inaccurate.

Another serious disadvantage attending the use of altimeters using pressure to denote the height lies in the fact that they do not indicate to the pilot the distance of the ground in the direction in which the plane is flying. Thus a plane might readily fly into a mountainside or other object in cloudy or rainy weather.

Briefly and broadly, the object of applicant's invention is to provide a distance measuring device which will serve as an altimeter and which will overcome all of the disadvantages enumerated above.

More in detail, an object of applicant's invention is to provide a distance measuring device by means of which the height of a plane from earth or the distance from a plane to an object in its course may be estimated correctly and quickly at all times and which will give correct readings even when the plane is only a few feet above the earth, or from the object toward which it is flying.

Another object of applicant's invention is to provide an altimeter which needs no adjustment after it is installed and which will give correct readings no matter what the height above sea level, from which the plane starts the flight.

A further object of the present invention is to provide an altimeter or distance indicating device, as set forth above, which will not only indicate to the pilot the distance the plane is above earth but will also indicate to the pilot the distance between the plane and any object in the plane's path, as, for instance, a mountain, building, etc.

The above objects are attained in one instance in accordance with the present invention by means of a radio frequency signalling system wherein a high frequency is generated intermittently and sends out impulses from a transmitter, which impulses strike the earth or an object in the path of the plane from which they are reflected back to a receiver. The receiver is operative only when no impulse is sent by the transmitter. An indicator cooperating with the receiver and transmitter is actuated only by said reflected wave to indicate the time the wave used in travelling from the transmitter to the earth or other object and returning to the receiver. This time will be equal to the distance between the plane and the object divided by one half the speed of light.

More in detail, distances are measured in accordance with one modification of applicant's invention by producing at a transmitter a very high frequency keyed by a second oscillator at a considerably lower frequency so that only a few cycles of high frequency energy at a time are radiated. The transmitter at the same time charges a condenser which has crossing its terminals a suitable resistance. This resistance, when the transmitter is on space, discharges the condenser at a predetermined rate. A receiver adjacent the transmitter is provided with means controlled by the low frequency oscillator for rendering it inoperative when the transmitter is operative thereby preventing the transmitted energy from directly affecting the receiver. The receiver rendered operative by the reflected wave further discharges the condenser resistance unit. Consequently, when a transmitted wave is reflected from the ground or other object and reaches the receiver the condenser will have a charge dependent on the length of time between the cutting off of the transmitter and the reception of the reflected wave at the receiver. The average value of the charge on this condenser may be utilized in a manner which will appear more in detail hereinafter to indicate the distance between the reflecting object and the receiver.

A modification includes a plurality of sets of condensers and resistances of different sizes. These condensers and resistances being of different sizes have different time constants, thereby giving the altimeter a different range over the scale of the indicator.

In a further modification the energy is fed from the intermittently operative transmitter to the grid of a thermionic tube having its anode circuit connected in series with the anode circuit of a second thermionic tube having its grid connected to the receiver, the tubes being biased to such a point that current can flow in the anode circuit only when reflected energy appears in the receiver simultaneously with the appearance of generated energy in the receiver directly from the transmitter. A meter in the series anode circuit will indicate the time of overlapping of direct energy and reflected energy. This meter may be calibrated to indicate the height of the plane. This modification differs from the prior modification as indicated and further, in that the low frequency oscillator does not control the operativeness of the receiver. Variable means is provided for compensating the direct transmission from the transmitter to the receiving aerial so that the compensating energy will reach the receiver in the proper phase and amplitude.

In a modification of this arrangement a single tube having two grids may replace the two tubes having their anode circuits connected in series.

A further modification involves the use of a transmitter working at a very high frequency, a receiver tuned to that frequency and coupled to the transmitter in such a way as to be able to key it, that is, to start and stop transmission and an indicating device. This indicating device may be a direct reading radio frequency meter. The transmitter is coupled to the receiver through lines over which compensating energy may be sent from the transmitter to the receiver that when the transmitter sends out a signal the receiver is not affected by the direct radiation of the signal on the receiver aerial. The receiver responds to the reflected wave and operates to cut off the transmitter. Obviously, when the transmitter stops sending the reflected wave will terminate. This in turn cuts off the receiver, which is normally biased to cut off. A modulation of the transmitter is effected, which modulation will have a frequency dependent upon the altitude of the plane or the distance between the plane and the object. The lower the plane or the nearer the plane to the object, the higher the frequency of modulation of the transmitter. The direct reading meter need only be calibrated in feet to serve as an altimeter. The modulating frequency, that is, the frequency at which the transmitter is modulated by the reflected wave through the receiver, will equal $$\frac{4H}{C}$$

cycles per second where H is the height of the plane and C the speed of light. Thus, at 80 feet altitude, the frequency of the meter will be 3000 kilocycles and at 1000 feet only 246 kilocycles. It will be obvious to the reader that with this altimeter extremely accurate readings may be taken close to the ground or object in the path of the plane.

The novel features of the present invention will be pointed out in the claims appended hereto. The nature of the invention and the mode of operation thereof will be better understood from the following description thereof when read in connection with the drawings throughout which like reference characters indicate like parts, and in which Figures 1, 3, and 5 show different modifications of applicant's distance meters; while Figures 1a, 3a, and 5a show the circuit details of the modifications of Figures 1, 3, and 5.

Figures 2 and 4 show modifications of the arrangements disclosed in Figures 1 and 3 respectively while;

Figures 2a and 4a show modifications of the arrangements of Figures 2 and 4 respectively.

Figure 1:
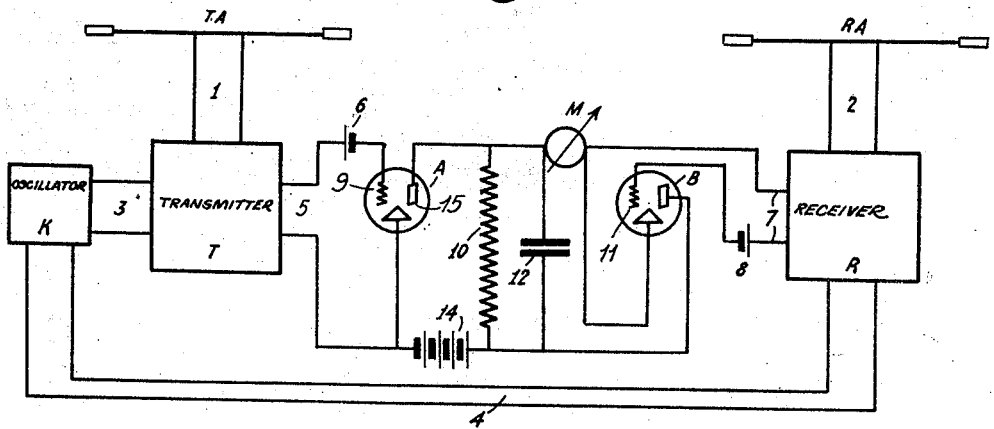

Referring to Figure 1 of the drawings, T indicates a high frequency transmitter, while R indicates a receiver which may be tuned to the frequency of the oscillations generated by the transmitter. The transmitter circuits per se, and the receiver circuits per se, will be described more in detail hereinafter by reference to Figure 1a of the drawings. A clearer understanding of the invention will probably be had by first describing broadly the several units involved and their cooperation. The transmitter T energizes the transmitting aerial TA through a line 1. A receiving aerial RA is connected through the line 2 to the receiver. An oscillator K, operating at a frequency which is low compared to the frequency of the transmitter, T, is coupled through line 3 to the transmitter T in such a manner as to modulate the transmitter from maximum to zero each cycle of the oscillator K so that the transmitter radiates only once each cycle of the oscillator K. The transmitter accordingly radiates a series of dots or signal impulses of high frequency energy the frequency of the dots or impulses being the frequency of the oscillator K. These dots are kept within small time limits so that only a few cycles of the high frequency oscillations generated by T are radiated to form each dot. The oscillator K is connected by line 4 to receiver R to send over a low frequency controlling wave which is utilized in any well known manner to render the receiver inoperative while the transmitter is operating. When the transmitter is on space, that is, is not sending out dots, the receiver R is permitted to receive signals. The receiver R picks up the radiated wave as it is reflected from the ground or nearest object. The time between the stopping of the transmitter, that is, the time at which it is cut off by K, and the time at which the reflected wave is received on the receiver, will be an indication of the distance between the transmitter and the reflecting object. The means for measuring this time will now be described.

A pair of tubes A and B are connected to the transmitter and receiver respectively as shown by lines 5 and 7. Tube A has its control electrode 9 negatively biased to cut off by means of a battery 6, while tube B has its control electrode 11 negatively biased to cut off by means of a battery 8. The anode 15 of A is connected through a resistance 10 and parallel condenser 12 in series with a source of potential 14 and the cathode of tube A. The anode 15 of tube A is connected through a meter M to the cathode of tube B, while the anode cathode circuit of tube B also includes the meter and the impedance between the anode and cathode of tube A in parallel with 10. The condenser resistance unit 10, 12 is in the anode circuit of both tubes A and B. The conductivity of the anode cathode impedance of tube A is controlled by the transmitter, through line 5. The conductivity of the anode cathode impedance of tube B is controlled by the receiver through line 7.

In operation, assume that no signal is being sent out by the transmitter. The grid of A being normally biased to cut off, no current flows in the anode cathode circuit of A. The condenser resistance unit 12, 10 is accordingly not charged. Assume now that a dot is sent out by the transmitter. The dot is radiated and simultaneously a high positive potential is supplied to the control electrode of A through line 5. This high potential overcomes the normal effect of biasing battery 6 and allows A to pass anode cathode current. Current flowing in resistance 10 charges the condenser 12 slowly. As soon as the dot ceases, that is, the transmitter stops operating, due to modulation to cut off by K, current stops flowing through the anode cathode circuit of A and the condenser 12 is no longer charged. The charge in condenser 12 starts to leak off through resistance 10. In the meantime the receiver has been inactive, that is biased to cut off by energy from K over line 4, while tube B has been nonconducting since normally biased to cut off by battery 8. The wave transmitted by the transmitting aerial TA, has been sent out and reflected back toward the receiver aerial RA. A short time after the dot has left the transmitter it is picked up on the receiving aerial RA and passes through line 2 to the receiver. The receiver responds to the dot and current flows in the output circuit of the receiver. This current overcomes the negative bias of 8 and makes the control electrode 11 of B sufficiently positive so that B becomes conductive and current flows in the anode cathode circuit of B. The charge on the condenser 12 is discharged through the anode cathode circuit of B. In discharging through B the current flows through meter M. The charge remaining on the condenser 10 when the transmitter was cut off to be discharged through the meter M will depend upon the length of time required for the transmitted dot to reach the reflecting object and return to the receiving aerial. Since the dots follow each other at a rapid rate the condenser 12 will be alternately charged and discharged at a frequency determined by the distance the dots have to travel and the rate at which 12 discharges through the resistance 10. Obviously, the scale of the frequency meter M can be calibrated in terms of distance above the earth or away from the reflecting object. By the use of high radio frequency signals and short dots the device can be made extremely accurate and will give accurate indications close to the ground.

Figure 2:
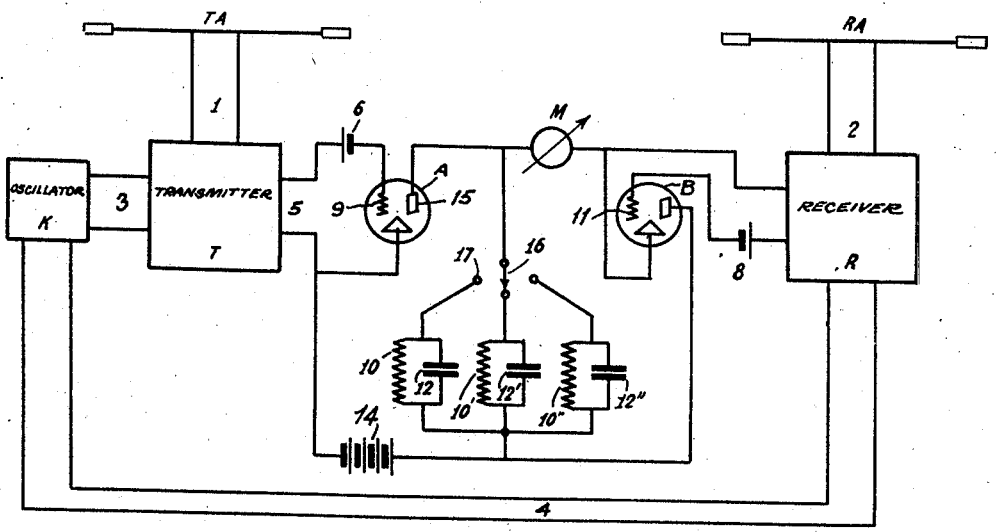

Since the time constants of the condenser 12 and resistance 10 determine the scale reading of the meter M, in order to be able to take accurate readings over a large scale, applicant proposes to provide as indicated in Figures 2 and 2a a plurality of sets of condenser resistance units 10, 12; 10', 12' etc., which may be switched in as indicated by a switch 16 cooperating with contacts 17. In this manner any one of a number of units, each having different time constants, may be connected in series with the meter M in the anode cathode circuit of B. The single meter may have a plurality of scales calibrated thereon, which scales cover a large range of frequencies.

The method of and means for generating high frequency oscillations used in transmitter T and for generating low frequency oscillations in K, the circuit arrangement of the receiver R, and the means and method for overcoming the bias normally applied to tube B by energy derived from the receiver R on the reception of the reflected wave, will now be described by referring to Figure 1a of the drawings.

In Figure 1a of the drawings the transmitter T, including the high frequency oscillation generator 20 and the low frequency oscillator K, is shown at the left hand side of the drawings, while the receiver R and the metering circuit, including tubes A and B, are shown at the right hand side of the drawings. Although it will be understood my invention contemplates use of any high and low frequency oscillation generators known today, for purposes of illustration a preferred form of transmitter oscillation generator and transmitter have been shown. The transmitter includes thermionic oscillator 20 having a tuned grid circuit 22 and tuned plate tank circuit 24. The tuned plate tank circuit 24 includes a tapped inductance connected through a blocking condenser 23 to the control electrode 25 of a thermionic amplifier 26. The thermionic amplifier 26 is of the screen grid type and has its anode circuit connected through a coupling inductance 28, tuned by condenser 27, and a choking inductance 29 to the positive terminal of a source of power. The source of potential is not shown but may be the same as that by means of which the anode circuit of 20 is charged through charging inductance 31. High frequency oscillations are shunted around this source by condenser C. The transmitting aerial Ta is connected to an inductance 30 coupled to inductance 28. High frequency oscillations generated by 20 will be amplified by 26 and impressed on 30 to be radiated from Ta. In order to control the transmitter so that only short pulses of high frequency oscillations are radiated, the screen grid electrode 37 of the amplifier 26 is connected with the low frequency oscillator K in such a manner that a modulating potential at the frequency of K is applied to the screen grid to alternately start and stop radiation from the output of the screen grid amplifier. The low frequency oscillator K includes a thermionic tube 32 having a grid including a frequency control piezo-electric crystal 33 shunted by a resistance R and a plate circuit including an inductance 34 tuned by parallel condenser 35. The inductance 34 is coupled to an inductance 36 connected in series with the screen grid cathode impedance of the amplifier 26. The oscillations at a frequency determined by the crystal 33 appearing in the circuit 36 will vary the potential applied to the screen grid electrode 31 of 26. By adjusting the constant direct current potential applied to the screen grid and the amplitude of the oscillations generated in the oscillator tube 32, modulation may be obtained in the screen grid tube 26 by as much as 100 per cent, so that the transmitter radiates a series of pulses separated by intervals during which no energy is radiated. Radio frequency choke coils 38 and 39 serve the same purpose in the anode circuit of 32 and in the screen grid electrode circuit of 26. Charging potential for the screen grid electrode of 26 and anode electrode of 32 is supplied from a source not shown, although in circuit with the inductances 38 and 39. The inductance 28 in the output circuit of the transmitter is also coupled through a link circuit 40 to the input circuit of the frequency measuring tube A. When a positive impulse is sent out by the transmitter the same positive impulse applied to the input circuit of tube A overcomes the normal biasing potential applied to the grid electrode thereof by 6 so that the tube A becomes conductive and the condenser 12 in the output circuit thereof is charged during the time the pulse is being sent out, as set out in more detail hereinbefore. The receiver includes the receiving aerial Ra connected through lines 2 to an inductance 42 coupled to a tuned inductance 43 in the input circuit of thermionic tube 45 which operates to cut off the receiver as will appear hereinafter. The thermionic tube 45, which is of the screen grid electrode type, has an anode circuit including a tuned inductance 44, which is independently coupled to an inductance 49 in the input circuit of thermionic detector 46. In order that no signals will appear in the receiver when the impulses are being radiated from the transmitter, receiver tube 45 is rendered nonconductive or inoperative, while the transmitter is operative. This is accomplished by connecting the anode cathode circuit of tube 45 in parallel with the anode circuit of a thermionic tube 50 known as the keying tube through an inductance 51. The input circuit of thermionic tube 50 is coupled by means of inductance 51' to the inductance 28 in the output circuit of the amplifier 26 in the transmitter. Potential for the anode circuit of 50 and of 45 is supplied through a resistance 56 from the common potential source not shown. The potential applied through 56 is such that when tube 50 is rendered conductive by an impulse applied to the input circuit thereof through 51' the drain of anode current through 50 and 56 is such that the potential applied from 56 through 51 to the anode electrode of 45 is so low that 45 is nonconducting. Accordingly, signals impressed on the receiver R from the transmitter will not appear in the anode circuit of the tube 45 unless they are reflected signals, since 45 is cut off or rendered inoperative during the entire time a pulse is being transmitted. Signals appearing in the input 49 of 46 are repeated in the tuned output circuit 57 as direct current or unidirectional pulses, due to the rectifying action of tube 46. These direct current pulses overcome the normal cut-off potential applied by biasing battery 8 to the input elements of tube B so that B becomes conductive. When B becomes conductive, as pointed out hereinbefore, the condenser 12 can discharge through the meter.

Since the receiver is operative only when the transmitter is inoperative, the tube B becomes conductive only on the receipt of a reflected signal. The action of the meter, due to current from the condenser 12, which is charged by A and discharged by B at a rapid rate, will indicate the distance the signal has travelled from the transmitter aerial to the reflector object and back.

The metering circuit, including the tubes A and B and the circuits connected between the electrodes thereof, as shown in Figure 1a, may be replaced by the metering circuit including the tubes A and B and associated circuit, as shown in Figure 2a. As the operation of a circuit as shown in Fig. 1a modified as indicated in 2a will be apparent from the description of the former the operation of 2a will not be set out in greater detail here.

In the prior described modification, indications of the meter are received only when the transmitter is inoperative and the receiver actuated by a reflected wave overcomes the negative bias on the control electrode of B. In many cases it might be desirable to have the meter operative during the time in which the transmitter is sending out a dot and the receiver is receiving the reflected dot, in other words, measuring the time in which the transmitted dot and the reflected dot overlap. Such an arrangement is shown in the modification illustrated in Figure 3. Here the transmitter T is keyed by low frequency oscillator K but the receiver is not rendered inoperative by K when T is operative. Direct radiation from the transmitter aerial TA reaching the receiver aerial RA is compensated by energy sent over line L from the transmitter to the receiver. This line includes amplitude adjusting means 18' in the form of a variable coupling inductance and phase adjusting means in the form of variable taps 19 connecting the line L to the receiver. The points 19 may be shifted along the transmission line L in a manner to pick off energy at the proper phase therefrom to compensate the radiated energy reaching the receiver RA from T by direct radiation. In this, arrangement as in the prior modification, the transmitter T is keyed or modulated from zero to maximum amplitude by oscillations from the oscillator K. Here, as in the prior arrangement, the transmitter feeds energy to the negatively biased control electrode 9 of tube A. Here, however, the anode cathode circuit of tube A and tube B is connected in series through the source 14 and meter M. Each of the tubes A and B are normally biased negatively to cut off by biasing batteries 6 and 8 as in Figure 1.

In operation, assuming no signal is being sent out. The control grids of A and B, being negatively biased to cut off, prohibit current from flowing in the anode cathode circuits. No current flows in the meter M and no indication is registered. Assuming the transmitter T sends out a dot, that is, a short series of high frequency oscillations. The direct radiation from the transmitter aerial on the receiver aerial is compensated by the line L so that the directly radiated energy has no effect on the receiver. The radiated wave reaches the reflecting object and returns to the receiving aerial RA. During this time the transmitter sends energy to the control electrode of tube A. This energy overcomes the negative bias applied by 6 to the control electrode of tube A. Normally this would allow anode cathode current to flow in tube A. However, no current can flow in A since the reflected wave has not as yet reached the receiving aerial no current can flow through the meter M since the grid 11 of B is biased to cut off by the battery 8 and the anode cathode circuit of B is in series with the meter and with the anode cathode resistance of tube A. When the reflected wave reaches the receiving aerial RA a positive potential is applied to the control electrode of tube B. This positive potential overcomes the negative potential applied to the control electrode by 8 and allows current to flow in the anode cathode circuit of tube B and of tube A which is also conductive due to the action of the transmitter thereon. This current flows through the meter M. Therefore, the meter will pass current during the time in which the reflected wave is received on the receiver aerial RA and the transmitted signal is received on the grid of A directly from the transmitter simultaneously. The length of time during which these signals are received simultaneously or overlap will be representative of the distance from the receiver aerial to the reflecting object. Accordingly, the meter is actuated only during the time when the anode cathode impedance of both tubes A and B are lowered due to the positive charge on the control grids thereon. In operation the meter M will pass a pulse of current at every cycle of the oscillator K. The duration of this pulse will depend upon the distance between the transmitting aerial and the reflecting object. The frequency meter M will assume a position dependent upon the altitude of the plane and the scale of the meter M may be calibrated in terms of altitude.

The method and means for generating the high frequency oscillations used in transmitter T and for generating the low frequency oscillations in K, the circuit arrangement of the receiver R, and the means and method for operating the circuits associated with the meter M, and for introducing energy directly from the transmitter to the receiver circuit to compensate energy radiated directly from the transmitter aerial to the receiver aerial, will be understood by reference to Fig. 3a.

In Figure 3a the oscillation generator and generator K and receiver R are substantially similar to the like circuits of Fig. 1a. In this modification, however, the keying tube 50 for the receiver is not necessary since in this modification the receiver is not cut off during transmission. However, in this modification compensating energy from the transmitter is impressed on the input of the receiver by means of an inductance 18' variably coupled, as indicated at 18, with the inductance 28 in the output circuit of the transmitter. Inductance 18' feeds energy to an inductance 43' over the line L. The inductance 43' is, as indicated, variably connected to the line L by taps 19 so that the phase of the high frequency oscillations reaching the secondary winding 43 in the input circuit of the receiver amplifier 45 may be adjusted to oppose and compensate the energy reaching the inductance 43 from the aerial RA by direct radiation. Since in this modification the meter M is not operative until both tubes A and B are conducting, and since A is conducting when the transmitter is operative, means is provided for rendering the tube B conductive when the reflected wave reaches the aerial. This means takes the form of a line 7 inductively connected on the one hand to the output circuit 57 of the rectifier 46 of the receiver, and on the other hand to the input circuit of tube B. Unidirectional pulses in 7, resulting from the rectified reflected signal in the receiver, will overcome the bias normally applied to the grid of B through battery 8 and render tube B conducting.

As pointed out in detail hereinbefore, when tubes A and B are both conducting current will flow in the meter M. The length of the duration of the pulses flowing in tube M will be an indication of the distance of the receiver from the reflecting surface.

As will be seen from the above, the basic principle of the system described in this modification consists of the measuring by means of averaging the current flowing through the meter M due to the overlapping of the transmitted and reflected wave. Obviously, it is not necessary to confine the measuring period to that period when the transmitted and received wave overlaps, but instead, the current may be allowed to flow only during the period when neither the transmitter nor the receiver is operating. This may be accomplished by normally biasing the tubes to such a value that current may flow through the tubes when the control grids thereof are not excited by signal frequency. Signal frequency appearing on the control grids will overcome this bias and bias the tubes to cut off rendering their impedances so high as to prevent current flowing through the meter. In this latter modification the reading on the meter would decrease with increasing altitude as in the prior modification since, as in the prior modification, the time during which the direct signal and the reflected signal overlaps, decreases with increase of altitude. The current may also be allowed to flow through the meter only when either the transmitter or receiver are operating single. In this case the meter reading will increase on an increase in altitude.

Figure 3:
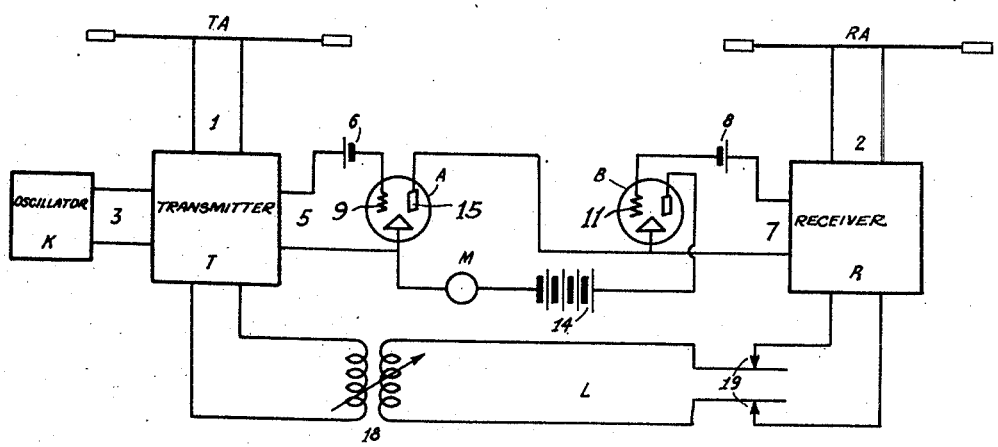
Figure 4:
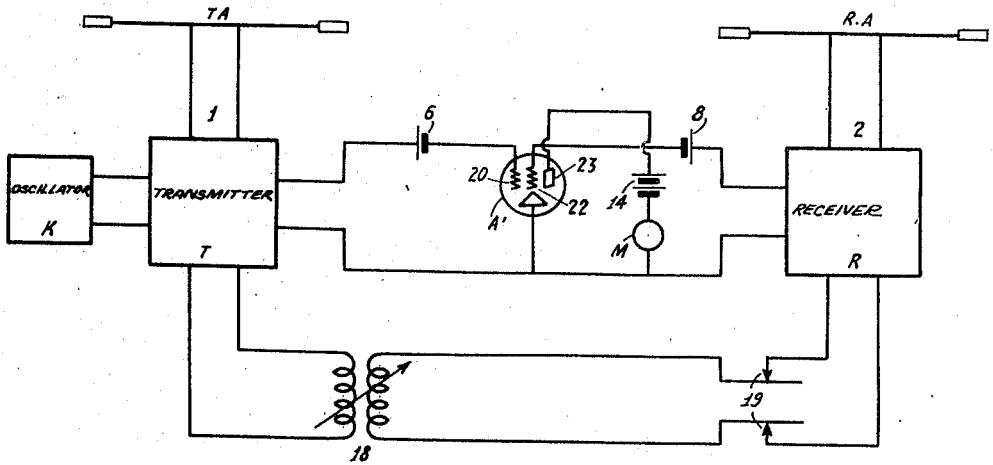

A further modification as illustrated in Figs. 4 and 4a contemplates the replacement of tubes A and B of Figs. 3 and 3a by a single thermionic tube A' having a pair of control electrodes 20 and 22 and a single anode 23. In this arrangement, as will be seen by reference to the drawings, the transmitter is connected directly through battery 6 to the control electrode 20 of the tube A', while the receiver is connected directly through the battery 8 to the control electrode 22 thereof. The anode cathode circuit includes the source of potential 14 and the meter M in series. In this modification, as in the arrangement shown in Figs. 3 and 3a, anode cathode current can flow only when a signal direct from the transmitter appears on the control electrode 20 at the same time that energy representative of a reflected signal on the receiver aerial appears on the control grid 22 of A'. This modification operates in a manner similar to the operation of the arrangement shown in Fig. 3. A statement of the operation of this modification is thought unnecessary.

In Figs. 5 and 5a is shown a simple arrangement whereby accurate altitude readings may be taken at any distance above the earth or from the reflecting object. This device utilizes a transmitter T working at a very high frequency. The transmitter T supplies energy to be radiated from transmitter aerial TA. A receiver R having a receiving aerial RA is connected through line L₁ to transmitter T in such a manner that when a signal is received on the receiving aerial RA the receiver output circuit will key the transmitter in such a manner as to start and stop oscillations therein intermittently as the reflected signal reaching the receiving aerial RA starts and stops.

This is accomplished in accordance with the present invention by the use of a receiver substantially similar to the receivers described hereinbefore, and a transmitter similar to the transmitters illustrated hereinbefore except that the modulating frequency generator K of the prior modifications is unnecessary in this modification. Means is provided for connecting the output of the receiver circuit to the final tube in the transmitter for keying the transmitter by energy from the output of the receiver. In the latter means resides the main distinction between the present altitude meter and the altitude meters of the prior modifications. Here the receiver aerial RA is connected as in prior modifications through a screen grid amplifier 45 to a rectifier tube 46 by means of coupling inductances 44 and 49. The unidirectional or pulsating current resulting in the output circuit of tube 46, due to rectifying action therein, is introduced into a line L₁ through coupling inductances 57 and 58. Line L₁ terminates in an inductance 36' coupled to the inductance 36 in the screen grid cathode circuit of the amplifier 26 of the transmitter. The current pulsations flowing in this line act through inductance 36' and inductance 36 in the screen grid cathode circuit to modulate or key the transmitter by modulating the constant direct current applied thereto thereby acting on the conductivity of the amplifier 26 in the output thereof. While in practice it is necessary to provide more amplification than is obtained by the single grid amplifier 45 for purposes of simplicity, a single amplifier for the received radio wave is shown prior to the detector or rectifier 46. It will be understood, however, that further amplification may be provided before or after the rectifier 46 without departing from the spirit of the invention. This last statement applies with equal pertinence to the amplifiers shown hereinbefore. The frequency meter M in this modification is inductively coupled through an inductance 28' to the inductance 28 in the tank circuit connected in the output circuit of the transmitter amplifier 26. Tuning means in the form of a capacity 27' permits the meter series circuit to be tuned to resonance. In order to prevent the transmitter T from affecting the receiver through direct radiation from TA to the receiver aerial RA a line L is connected between the transmitter and the receiver. This line L includes phase shifting and amplitude adjusting means PS in order that the energy fed therethrough from the transmitter to the receiver may be of proper phase and amplitude to compensate the energy radiated from the transmitter aerial directly to the receiver aerial.

In operation the frequency meter M indicates the frequency at which the transmitter T is keyed by the receiver R. The transmitter is arranged to operate continuously unless keyed by receiver R acting through line L₁. Assuming the plane to be flying at a certain altitude and the transmitter to be sending out signals. The receiving antenna RA will pick up two signals, one directly from the transmitting antenna TA and the other which reaches the aerial RA after being reflected from the ground or other object. The signal picked up directly from the transmitter aerial TA will be balanced out by means of the signal fed to the receiver by line L, which has been adjusted to transmit a signal to the receiver in the proper phase and amplitude to compensate the signal directly radiated thereto from the transmitter aerial. After the transmitted wave reaches the reflecting object and returns to the receiver aerial unidirectional pulses flowing in the output circuit of the receiver act on the conductivity of the amplifier 26 through its screen grid circuit inductively coupled to the inductance terminating line L. When the transmitter is shut off, the signal acting on the receiver will cease a definite time later, the time depending upon the time the signal has to travel to the reflecting object and back to the receiving aerial. When the signal from the transmitter ceases and the reflected signal ceases to reach the receiver aerial the transmitter again operates and emits a signal. This cycle, described above, will repeat itself indefinitely at a frequency dependent upon the distance between the transmitting aerial TA, the reflecting object and the receiver aerial RA through which the wave travels from the transmitter to the reflecting object and back to the receiver aerial. The frequency at which this operation is repeated will be representative of the height of the plane. The frequency at which the transmitter is modulated will be equal to $$\frac{4H}{C}$$

cycles per second where H is the altitude and C is the speed of light.

The frequency meter M is arranged to measure directly the frequency of modulation, that is the rate at which the reflected signal shuts off the transmitter T and not the frequency of the transmitter itself. The frequency of this modulation will give an accurate indication of the height of the plane above ground or the distance of the plane from the reflecting object. The scale used to measure this frequency may be calibrated in feet altitude instead of cycles. A frequency of 3000 kilocycles per second will correspond to 80 feet altitude and frequency of 246 kilocycles per second will correspond to 1000 feet altitude.

I claim:

1. In a distance measuring device the combination of a high frequency thermionic transmitter, crystal controlled thermionic modulating means for said transmitter, a high frequency thermionic receiver, a control circuit connecting said receiver to said transmitter and adapted to render said receiver inactive when said transmitter is operative, an impulse measuring circuit including a normally non-conducting thermionic tube connected with said transmitter, and a circuit for coupling said receiver with said measuring circuit.

2. In altitude measuring means the combination of a high frequency transmitter, a high frequency receiver, a keying circuit connecting said receiver to said transmitter and adapted to render said transmitter inactive when said receiver is operative, a thermionic relay and a frequency meter coupled with said transmitter and said receiver, said thermionic relay being normally biased to cut off, and means associated with said receiver and responsive to energy therein representative of indirect or reflected energy from said transmitter for overcoming the normal bias on said thermionic relay.

3. In a distance measuring device the combination of a high frequency transmitter, a high frequency receiver, an oscillator connected with said transmitter and with said receiver and adapted to key said transmitter and to render said receiver inoperative when said transmitter is keyed, an indicating circuit comprising a pair of thermionic tubes having anode and cathode circuits connected in parallel, a meter in one of said circuits, a time element device including a resistance and parallel condenser in one of said circuits, means for normally biasing said tubes to cut off, means for overcoming the bias of one of said tubes including a connection between a control electrode of one of said tubes and said transmitter, and means for overcoming the bias of the other of said tubes including a connection between the receiver and the control electrode of said last named tube.

4. In an altitude meter the combination of a high frequency transmitter, a thermionic receiver, a low frequency oscillator connected with said transmitter and with said receiver and adapted to key said transmitter and to render said receiver inoperative, an indicating circuit comprising a thermionic relay including a plurality of tubes with their anode to cathode impedances connected in parallel, a meter in one of said connections, a time element device including a resistance and parallel condenser in said circuit, means for normally biasing said tubes to cut off, means for overcoming the normal bias of one of said tubes including a connection between a control electrode of one of said tubes and said transmitter, and means for overcoming the bias of another of said tubes including a connection between the receiver and the control electrodes of said last named tube.

5. In radio apparatus the combination of a transmitter, a receiver adjacent thereto, means for preventing direct radiation from said transmitter from reaching said receiver, whereby said receiver is affected by reflected energy only from said transmitter, a modulation frequency oscillator connected with said transmitter, an indicating means including a pair of thermionic tubes having anode and cathode electrodes connected in series through a meter, and circuits for connecting the control electrode of one of said tubes to said transmitter, and the control electrode of the other of said tubes to said receiver.

6. In an altimeter the combination of a thermionic transmitter, a thermionic receiver, means for preventing the direct radiation from said transmitter from affecting said receiver, an electron discharge tube constituting a variable impedance connected with the output circuit of said transmitter, a second electron discharge tube constituting a variable impedance connected with the output circuit of said receiver, the impedances of said discharge tubes being in series, and a meter in series with said impedances.

7. In means for measuring the distance from a transmitter to a reflecting object, the combination of a transmitter and receiver, a measuring circuit comprising a pair of thermionic tubes, a resistance and a condenser connected between the output electrodes of one of said tubes, means for connecting the output impedance of the other tube in parallel with said resistance and condenser, a meter in said last named connection, a coupling between the input electrodes of one of said tubes and said transmitter and a coupling between the input electrodes of said other tube and said receiver.

8. An altitude indicating device including a transmitter, a receiver including an aerial responsive to indirect radiation, thermionic keying means for rendering said transmitter operative and inoperative intermittently, means for rendering said receiver inoperative when said transmitter is operative, and means for indicating the time it takes the transmitted wave to reach the reflecting object and return to the receiver aerial including, a thermionic tube having its input electrodes coupled to the output of said transmitter and its output electrodes coupled to a meter, and a second thermionic tube having its input electrodes coupled to said receiver and its output electrodes coupled to said meter.

9. An altitude indicating device including a transmitter, a receiver including an aerial in the vicinity of said transmitter, said receiver being responsive to radiation which has been reflected from a conductive object only, automatic means for operating said transmitter intermittently, thermionic demodulating means connected between said transmitter and said receiver for rendering the latter inoperative intermittently, and thermionic means connected with the output of said transmitter and the output of said receiver for measuring the time it takes the transmitted wave to reach the reflecting object and return to the receiver aerial.

10. In altitude measuring means the combination of an intermittently operated high frequency transmitter, a high frequency transmitter, a control circuit connecting said receiver to said receiver and adapted to render said receiver inactive when said transmitter is operative, a pair of thermionic tubes, an output circuit comprising a charging condenser and a resistance connected with the output electrodes of one of said tubes, a source of potential in said circuit, means for connecting the impedance between the output electrodes of the other of said tubes in parallel with the output circuit of the first named tube, a meter in said last named connection, and link circuit for connecting the input electrode of one of said tubes to the output circuit of said transmitter and of the other of said tubes to said receiver.

11. In altitude measuring means the combination of a high frequency thermionic transmitter, a high frequency thermionic receiver, a frequency meter, a thermionic tube connecting said transmitter to said meter, a thermionic tube connecting said meter to said receiver, means for preventing direct radiation from said transmitter from energizing said receiver, and means for energizing said meter when indirect radiation reaches said receiver from said transmitter.

12. An altitude indicating device including a transmitter comprising, a source of high frequency oscillations, and a thermionic amplifier having its input electrodes coupled to said source of high frequency oscillations and its output electrodes connected with an output circuit, receiving means including an aerial adjacent said transmitter, said means being responsive to radiation from said transmitter which reaches said aerial only after reflection from a conductive object, a thermionic amplifier in said receiving means connected with said receiver aerial, a circuit coupling said thermionic amplifier in said receiver to said thermionic amplifier in said transmitter, and means including an indicator in said coupling circuit for indicating the time it takes the transmitted wave to reach a reflecting object and return to the receiver aerial.

13. In an altitude indicating device, a transmitter having a source of high frequency oscillations, an electron discharge tube amplifier coupled to said source and having an output circuit, including a transmitting antenna, a receiver having an input circuit, including a receiving antenna, and an electron discharge tube amplifier under control of energy collected by said receiving antenna, means including a multi-grid electron tube for producing modulations of said high frequency oscillations in accordance with the operation of said receiver, means including a phase-shifting device intercoupling the output circuit of the transmitter with the input circuit of the receiver for rendering said receiver unresponsive to radiation from said transmitting antenna until after such radiation has been reflected from a conductive object, and means coupled to the output circuit of said transmitter amplifier for indicating a modulation characteristic of said high frequency oscillations.

14. In a measuring device the combination of, a high frequency transmitter including means for producing and amplifying high frequency oscillations, a thermionic receiver including signal absorption and signal amplifying means, an oscillator connected with said transmitter to key said transmitter at the frequency of said oscillator, said oscillator being coupled by way of said transmitter amplifier to said receiver, an indicating circuit comprising a plurality of thermionic impedances, a circuit for connecting said impedances in series by way of a meter, said impedances being normally of such a high value as to prevent a flow of current therethrough, a circuit connected with said thermionic means and said transmitter amplifier to reduce one of said impedances when said transmitter is operative, and a circuit connecting said thermionic means to said receiver to reduce the other of said impedances when said receiver is operative.

15. In a distance measuring device the combination of, a transmitter including a thermionic oscillation generator and a thermionic amplifier of the screen grid type connected therewith, a thermionic receiver, said receiver including an absorption device and thermionic amplifying means, means for preventing a direct radiation from said transmitter from acting on said receiver including, a circuit having phase changing means coupled between the output circuit of said transmitter amplifier tube and the input circuit of said receiver amplifier tube, a circuit coupled between the output circuit of said receiver amplifier tube and the screen grid electrode of said transmitter amplifier tube, and a frequency meter coupled to said transmitter.

16. In an altitude measuring means the combination of, a high frequency thermionic transmitter, a high frequency thermionic receiver adjacent thereto, a frequency meter, a thermionic impedance connecting said transmitter to said frequency meter, a thermionic impedance connecting said receiver to said frequency meter, means for preventing direct radiation from said transmitter from energizing said receiver, and energizing means in a circuit common to both of said thermionic impedances and said meter.

17. An altitude indicating device including a transmitter, a receiver including an aerial and demodulating means adjacent said transmitter, circuits permitting energy resulting from indirect or reflected radiation only to reach said demodulating means, automatic means for rendering said transmitter intermittently operative and inoperative, impulse counting means and circuits coupling the output of the demodulating means to said counting means and the output of said transmitter to said counting means.

18. In altitude measuring means, the combination of a high frequency transmitter of a thermionic type, a high frequency receiver of the thermionic type, a control circuit connecting said receiver to said transmitter and energized by said receiver on the reception of energy sent out by said transmitter and reflected to said receiver from a conductive object to render said transmitter inactive when said receiver is operative, a frequency meter connected with the output of said transmitter, and a circuit of variable impedance coupling the output of said transmitter to the input of said receiver for preventing direct radiation from said transmitter from energizing said receiver.

19. In a measuring device, the combination of a transmitter including a thermionic tube, a receiver adjacent thereto, a circuit connecting said receiver to said transmitter for compensating direct radiation from said transmitter to said receiver whereby energy from said transmitter affects said receiver only after reflection from a conducting object, a connection between the output of said receiver and a control electrode in the thermionic tube of said transmitter, and a frequency meter connected with said transmitter output to indicate the frequency of the energy in the output of said transmitter as controlled by said receiver by way of said connection between the output of said receiver and the control electrode in the thermionic tube in said transmitter.

20. In a distance measuring means, the combination of an intermittently operable transmitter, a receiver operable during inoperable periods of said transmitter, said receiver including an aerial located adjacent said transmitter, a thermionic keying tube connected with said transmitter for keying the same, means including a second thermionic keying tube operative under control of impulses directly derived from the output of said transmitter for determining periods during which said receiver should be rendered inoperative, and means responsive to energy alternately delivered by said transmitter and by said receiver for indicating the distance travelled by a radio wave emanating from said transmitter, reflected from a conductive object and then received by the aerial of said receiver.

CLIFFORD B. TERRY.